United States Patent [19]
Araki et al.

[11] Patent Number: 5,499,348
[45] Date of Patent: Mar. 12, 1996

[54] DIGITAL PROCESSOR CAPABLE OF CONCURRENTLY EXECUTING EXTERNAL MEMORY ACCESS AND INTERNAL INSTRUCTIONS

[75] Inventors: Toshiyuki Araki, Yawata; Kunitoshi Aono, Hirakata; Masaki Toyokura, Katano, all of Japan

[73] Assignee: Matsushita Electric Industrial Co., Ltd., Osaka, Japan

[21] Appl. No.: 266,104

[22] Filed: Jun. 27, 1994

Related U.S. Application Data

[63] Continuation of Ser. No. 659,571, Feb. 22, 1991, abandoned.

[30]    Foreign Application Priority Data

Feb. 27, 1990   [JP]   Japan ..................................... 2-048619

[51] Int. Cl.⁶ ....................................................... G06F 9/38
[52] U.S. Cl. ............................................ 395/375; 395/427
[58] Field of Search .................................... 395/375, 775, 395/275, 800, 425

[56]               References Cited

U.S. PATENT DOCUMENTS

| | | | |
|---|---|---|---|
| 4,128,880 | 12/1978 | Cray, Jr. ................................... | 364/200 |
| 4,837,730 | 6/1989  | Cook et al. ............................... | 395/800 |
| 4,926,317 | 5/1990  | Wallach et al. .......................... | 364/200 |
| 4,989,113 | 1/1991  | Hull, Jr. et al. ......................... | 395/425 |
| 5,127,093 | 6/1992  | Moore, Jr. ................................. | 395/375 |
| 5,155,820 | 10/1992 | Gibson ...................................... | 395/375 |
| 5,179,530 | 1/1993  | Genusov et al. ......................... | 395/800 |
| 5,185,872 | 2/1993  | Arnold et al. ............................ | 395/375 |

OTHER PUBLICATIONS

Peter M. Kogge, *The Architecture of Pipelined Computers*, 1981, McGraw–Hill, pp. 171–173.

Primary Examiner—William M. Treat
Attorney, Agent, or Firm—Stevens, Davis, Miller & Mosher

[57]               ABSTRACT

The digital processor includes an instruction memory, a sequencer, a decoder, and a memory reference control circuit. In case the sequencer reads the external memory reference instruction, the memory reference control circuit serves to fetch an external memory reference instruction signal and an operand of the external memory reference signal delivered from the decoder, hold the operand until the external memory cycle executed by the external memory reference instruction is terminated, and release the operand when the cycle is terminated. The sequencer serves to have succeeding instructions read out continuously while the external memory reference instruction is being executed, and to concurrently execute the read-out instructions when the read-out instructions refer to resources not occupied by the external memory reference instruction, so as to execute the read-out instructions in parallel with the external memory reference instruction, thereby improving the throughput of the total processing.

10 Claims, 15 Drawing Sheets

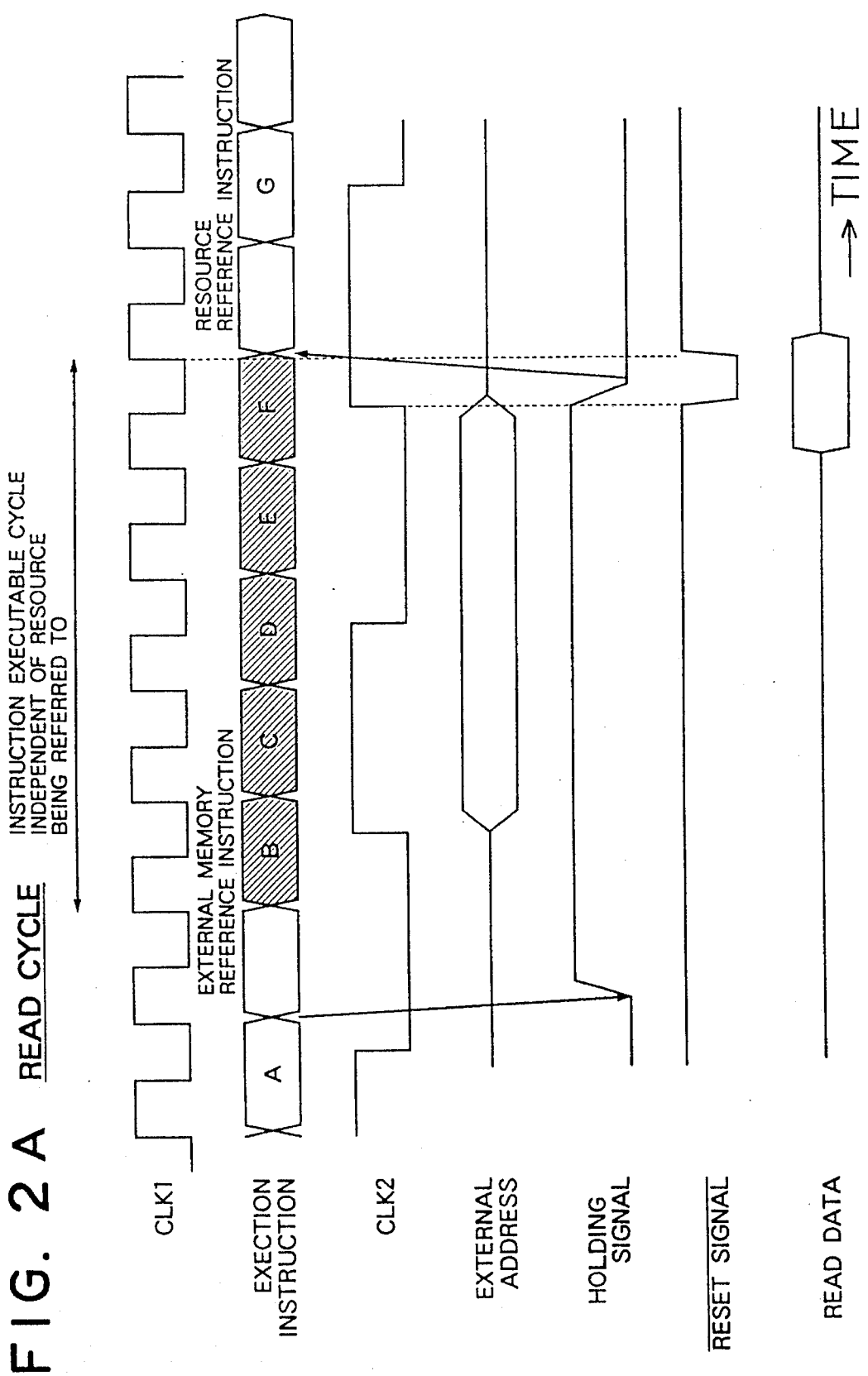

EXCUTING SEQUENCE OF CONVENTIONAL PROCESOR

EXECUTING SEQUENCE OF PROCESOR OF FIRST EMBODIMENT

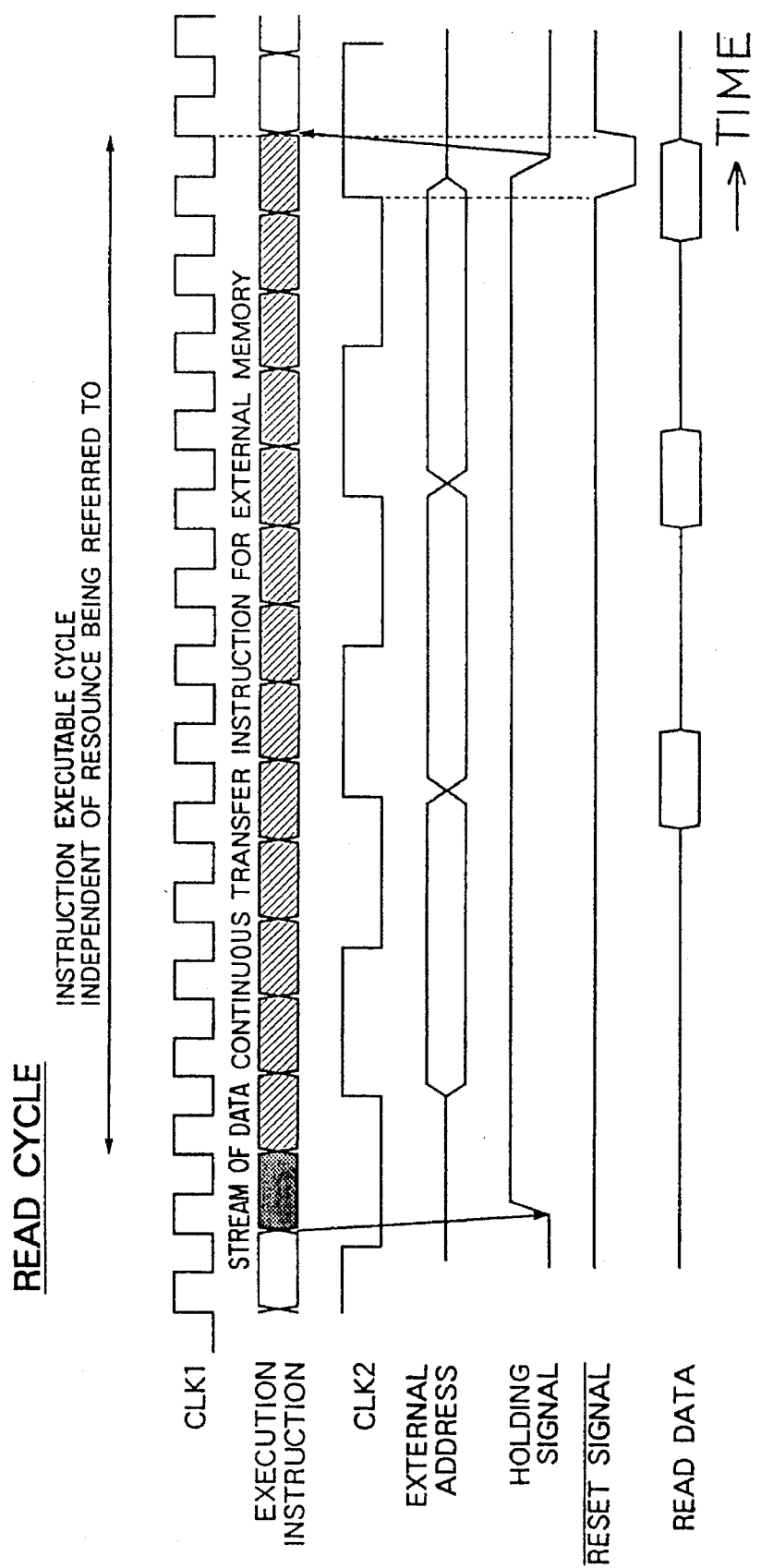

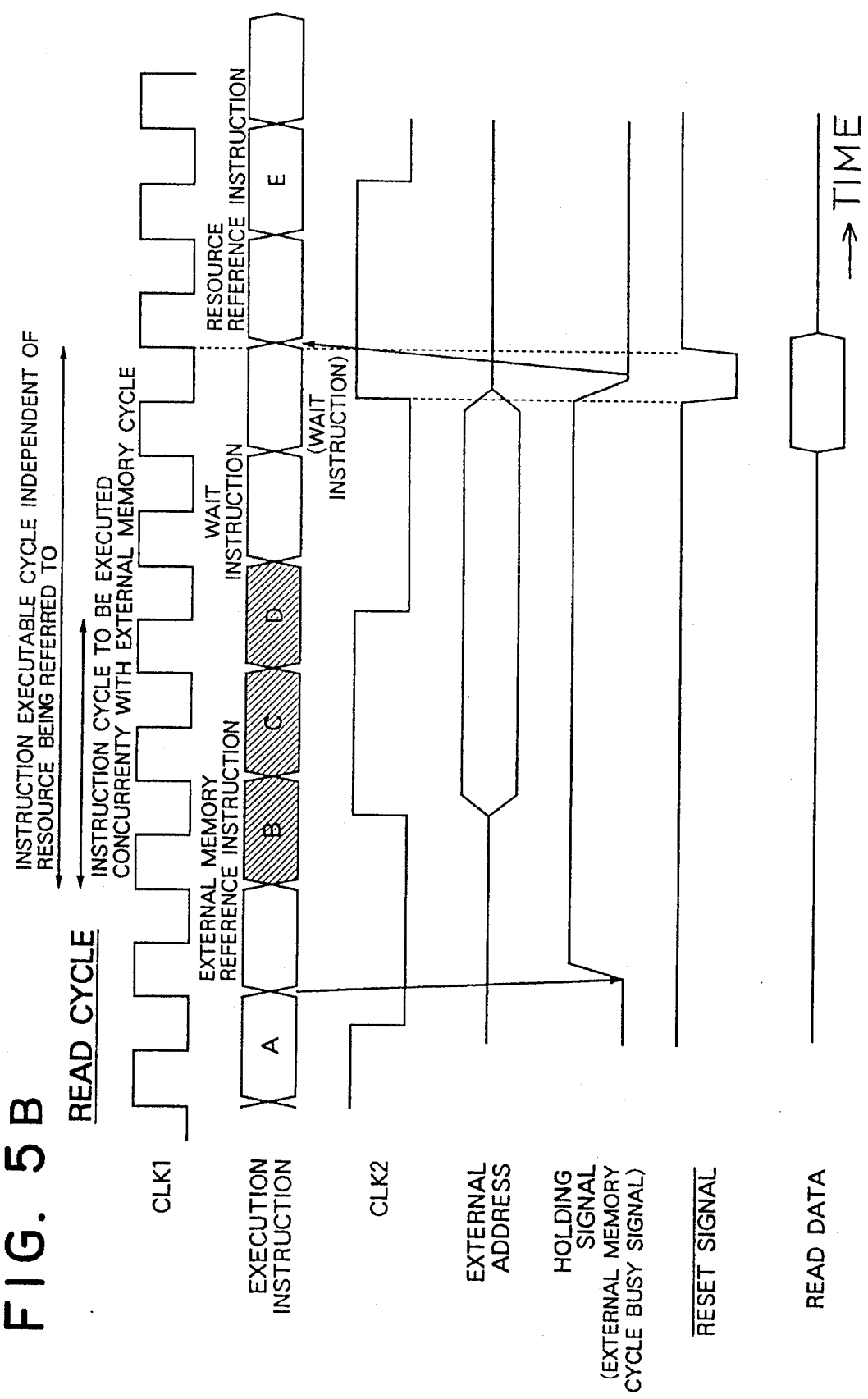

EXECUTION SEQUENCE OF PROCESSOR OF THIRD EMBODIMENT

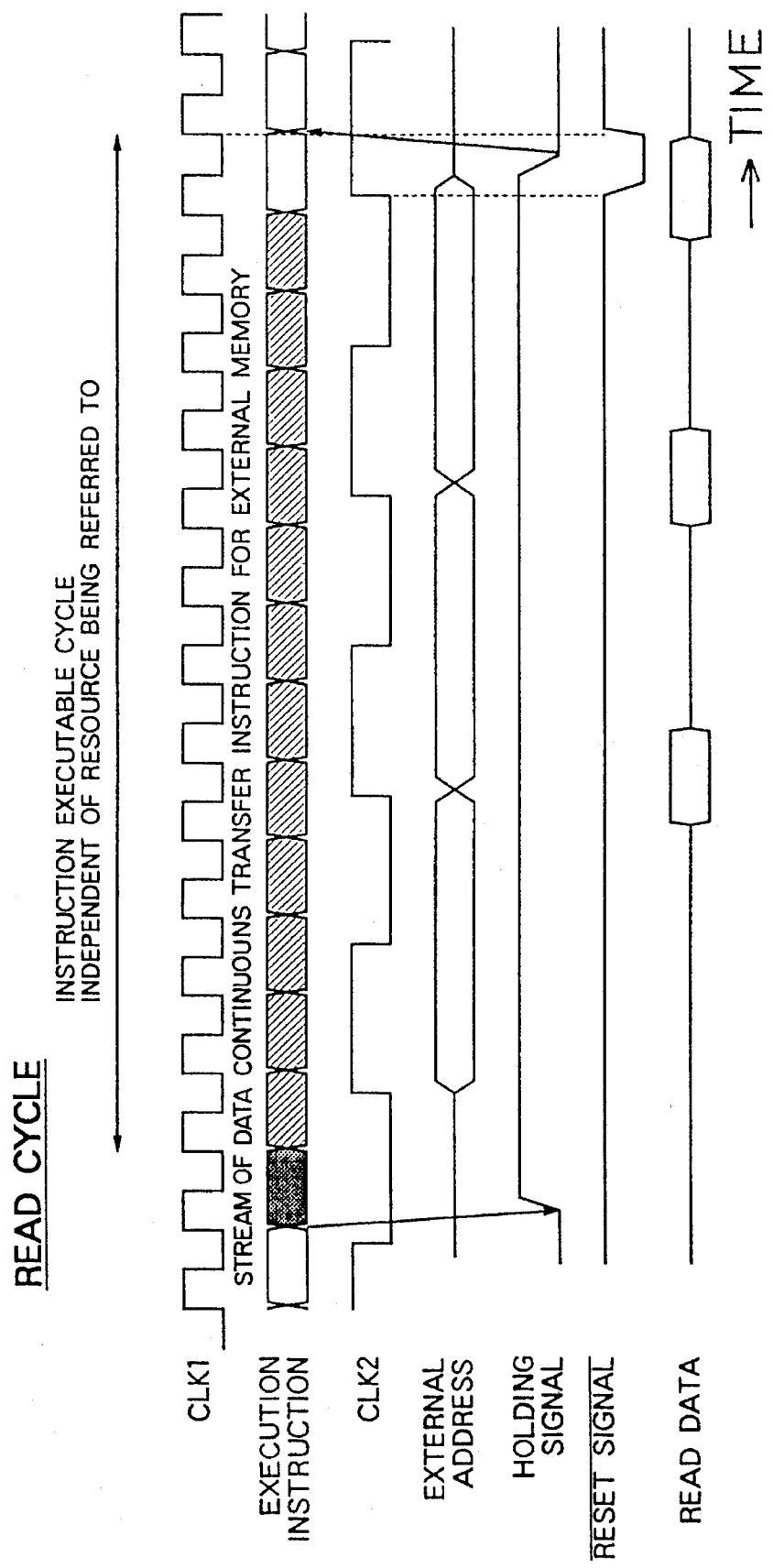

READ CYCLE

DIGITAL PROCESSOR CAPABLE OF CONCURRENTLY EXECUTING EXTERNAL MEMORY ACCESS AND INTERNAL INSTRUCTIONS

This application is a continuation of application Ser. No. 07/659,571, filed Feb. 22, 1991 (abandoned).

BACKGROUND OF THE INVENTION

1. Field of the Invention

The present invention relates to a digital processor.

2. Description of the Related Art

The manner in which the conventional digital processor refers to an external memory will be described with reference to FIG. 6.

In FIG. 6, 601 denotes a digital processor. The digital processor 601 includes as main components an instruction memory 602, a program control unit 603, an external memory reference control circuit 604 for controlling reference to the external memory, an arithmetic unit for actually executing the operation, and an operation block 605 having a register for storing data, an internal memory, and the like. The program control unit 603 contains a sequencer 603a which sequentially executes an instruction code read from the external memory 602 by outputting an address (PC) to the instruction memory 602 in synchronization with a clock 1 (CLK 1) and a decoder 603B which analyzes the instruction code and outputs various operands. The various operands used herein denote an address (adrs), data, and a control signal (ctl) such as a write signal.

Now, the manner in which the digital processor 601 operates to refer to the external memory 606 will be described.

FIG. 7 is a timing chart based on a read cycle involved in an external memory cycle done in the digital processor 601.

The digital processor 601 realizes an asynchronous memory cycle based on an acknowledge signal. In operation, when the external memory reference instruction read by the sequencer 603a is executed, the external memory reference control circuit 604 serves to output the external address (adrs) and the control signal (ctl) such as a write signal. The sequencer 603a stops execution of the next instruction and keeps a WAIT cycle until supplied with an acknowledge signal sent from the external memory 606. In the READ cycle, the data is read on a leading edge of a first clock 1 (CLK 1) after the acknowledge signal is supplied.

The above-mentioned control is realized by the program control unit 603 having the sequencer 603a, the decoder 603b, and the external memory reference control circuit 604.

The foregoing digital processor 601 is, however, required to have too long a WAIT cycle if the processor refers to a memory or a device requiring a long access time, resulting in degradation of a throughput of the total processing. Further, in case the digital processor 601 executes an instruction for continuously transferring a large amount of data between the external memory and the digital processor 601 itself, the throughput is further degraded.

While the external memory reference instruction is being executed, a resource reference instruction is often issued to the program control unit 603 for referring to a resource occupied by the instruction being executed. In general, since the resource is exclusively controlled, the program control unit 603 is disadvantageously required to execute a meaningless instruction (NOP instruction) until the external memory cycle is terminated.

SUMMARY OF THE INVENTION

It is, therefore, a first object of the present invention to provide a digital processor which is capable of concurrently executing one or more instructions for referring to one or more resources unoccupied by another instruction while a slow memory or device is being referred to, thereby improving a throughput of the total processing.

It is a second object of the present invention to provide a digital processor which is capable of achieving the first object and which allows both of the instructions to refer properly to the same resource in synchronization if one instruction is issued for referring to the resource being referred to by the other instruction, thereby improving a throughput of the total processing.

In carrying out the objects in a preferred mode, the digital processor of one embodiment comprises an instruction memory, a sequence, a decoder, and an external memory reference control circuit operative when the sequencer reads an external memory reference instruction from an instruction memory, for controlling the operations of fetching an external memory reference instruction signal indicating execution of an external memory reference instruction output by the decoder and an operand of the external memory reference instruction, holding the operand during the execution of an external memory cycle based on the external memory reference instruction, and releasing the operand when the cycle is terminated, the sequencer keeping later instructions being read during the execution of the external memory reference instruction and executing the later instructions concurrently with the external memory reference instruction if the read instructions are an instruction group for referring to resources unoccupied by the external memory reference instruction.

The digital processor of another embodiment comprises an instruction memory, a sequencer, a decoder, and an external memory reference control circuit, operative when the sequencer reads an instruction for continuously transferring streams of data between the digital processor itself and an external memory from the decoder, for controlling the operations of fetching a stream of data continuous transfer instruction signal indicating execution of the stream of data continuous transfer instruction output by the decoder and an operand of the stream of data continuous transfer instruction, holding the operand until the final data transfer cycle executed on the stream of data continuous transfer instruction is terminated, and releasing the operand when the final data transfer cycle is terminated, the sequencer serving to keep later instructions being read during the execution of the stream of data continuous transfer instruction and execute the read instructions concurrently with the stream of data continuous transfer instruction if the read instructions are an instruction group unoccupied by the stream of data continuous transfer instruction.

The digital processor of yet another embodiment comprises an instruction memory, a sequencer, a decoder, and a memory reference control circuit, the memory reference control circuit serving to send out an external memory cycle busy signal to the sequencer during execution of an external memory reference instruction or a stream of data continuous transfer instruction, the sequencer serving to keep the current executing operation if the external memory cycle busy signal indicates a BUSY state during execution of a WAIT instruction for checking whether or not the external memory cycle is busy and to proceed to the next operating step if the busy signal indicates a READY state.

The digital processor of the first embodiment is capable of executing one or more instructions for concurrently referring to one or more resources unoccupied by an external memory reference instruction being executed, thereby enhancing a throughput of the total processing.

The digital processor described in the second embodiment is capable of executing one or more instructions for referring to one or more resources unoccupied by a stream of data continuous transfer instruction for the external memory being executed concurrently with the data continuous transfer instruction, thereby enhancing a throughput of the total processing.

The digital processor described in the third embodiment allows an external memory reference instruction and a resource reference instruction to properly refer to the same resource in synchronization if the latter instruction for the same resource being referred to by the former instruction is issued, thereby enhancing a throughput of the total processing.

BRIEF DESCRIPTION OF THE DRAWINGS

FIGS. 2A is a timing chart of the digital processor according to the first embodiment;

FIGS. 2B-2 is a view showing a sequence in which instructions are executed in the digital processor according to the first embodiment;

FIG. 3 is a timing chart of the digital processor according to the second embodiment;

FIGS. 5B and 5D are timing charts of the digital processor according to the third embodiment;

DESCRIPTION OF THE PREFERRED EMBODIMENTS

Figure 1A:
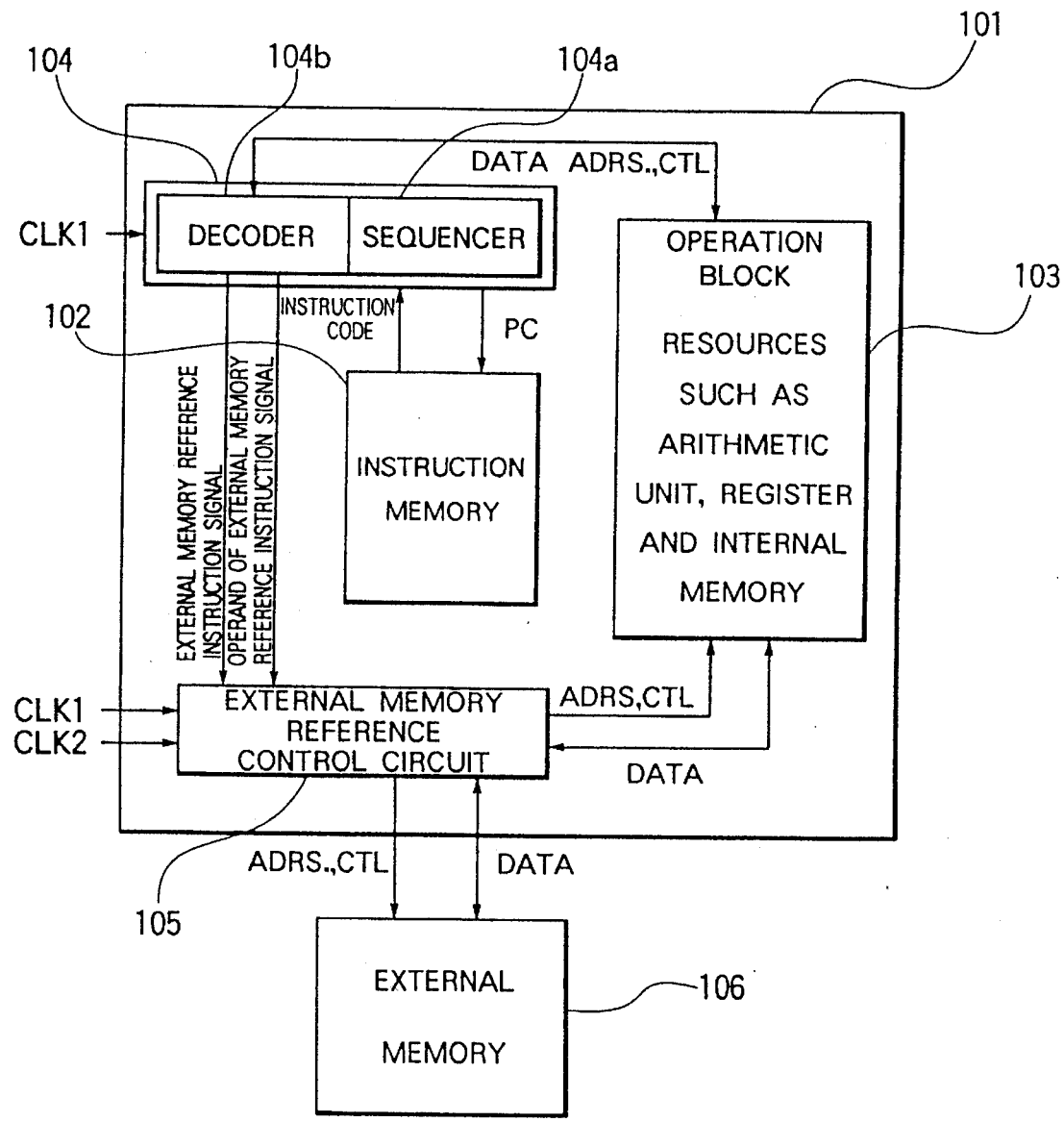
FIGS. 1A, 1B, and 1C are block diagrams showing digital processors according to first and second embodiments of the present invention.

FIG. 1a is a block diagram showing a digital processor according to a first embodiment of the invention.

As shown, 101 denotes a digital processor. The digital processor 101 includes an instruction memory 102, an operation block 103 having an arithmetic unit, a register, an internal memory, and the like, a program control unit 104 having a decoder 104b and a sequencer 104a, and an external memory reference control circuit 105 for controlling the reference to the external memory if an instruction code for referring to the external memory is to be executed. The sequencer 104a serves continuously to read instruction codes from the instruction memory 102 on the basis of a clock 1 (CLK 1) input from the outside. The decoder 104b serves to analyze the instruction codes read by the sequencer 104a and to control the operation block 103 and the external memory reference control circuit 105 based on the analyzed result. Further, the decoder 104b outputs an external memory reference instruction signal indicating execution of the external memory reference instruction and an operand of the instruction to the external memory reference control circuit 105. The operand includes an address (adrs), data (data), and a control signal (ctl) such as a write signal. The digital processor 101 is connected to the external memory 106 provided outside the processor itself. The external memory reference control circuit 105 is controlled on the basis of a clock 2 (CLK 2) and a clock 1 (CLK 1) produced to adapt to the memory cycle of the external memory 106. The digital processor 101 normally operates faster internally than externally. Accordingly CLK 2 is slower than the CLK 1.

Figure 1B:
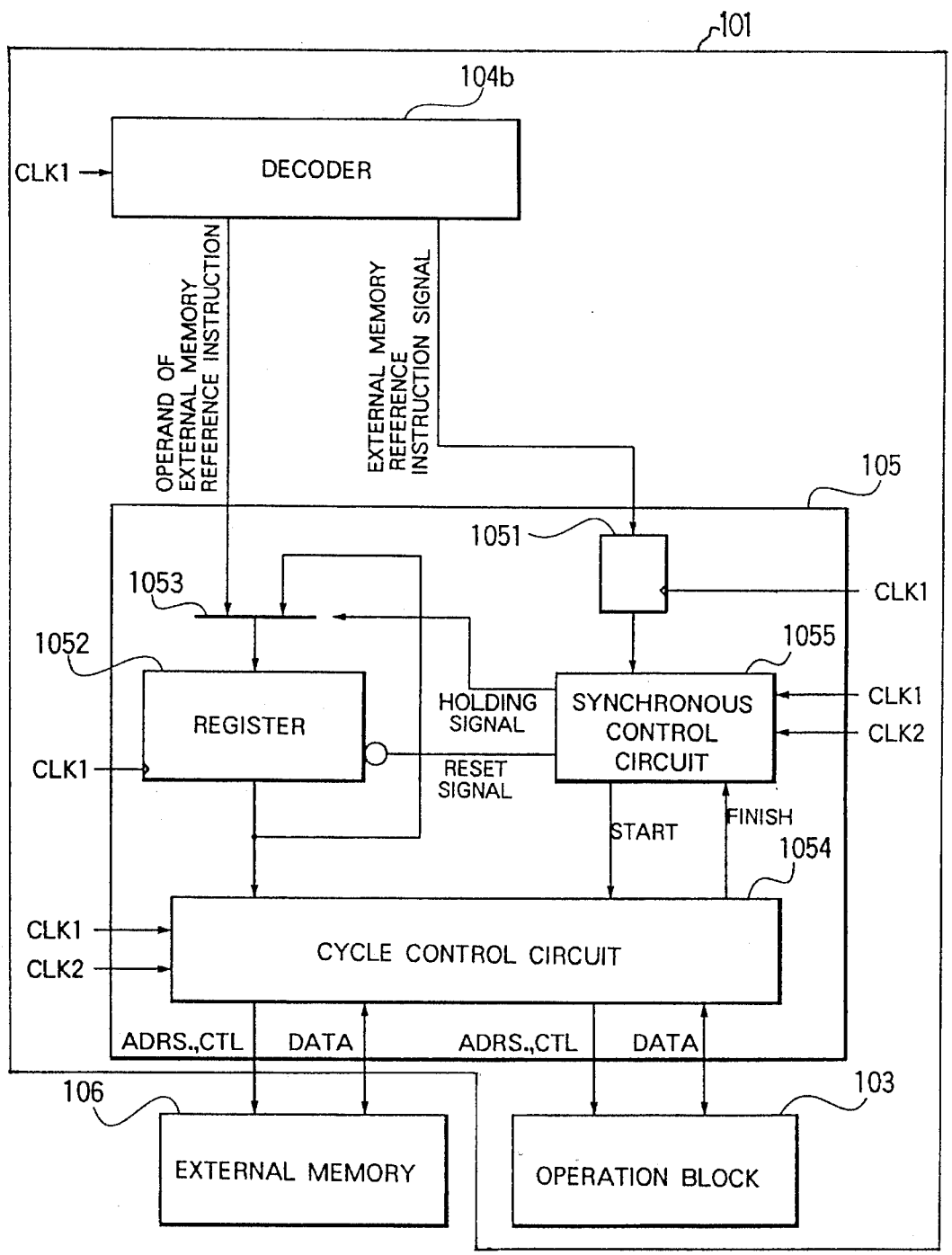

FIG. 1B is a block diagram showing the external memory reference control circuit 105 provided in the digital processor 101. The external memory reference control circuit 105 includes a register 1051 for fetching an external memory reference instruction signal output by the decoder 104b, a register 1052 for fetching an operand of the external memory reference instruction, a selector 1053 for holding data stored in the register 1052, a cycle control circuit 1054 for controlling an address (adrs.), data, a control signal (ctl) such as a write signal, and the like contained in a resource stored in the memory, and a synchronous control circuit 1055 for synchronizing CLK 1 and CLK 2, starting the cycle control circuit 1054, sensing the termination, and outputting a holding signal for controlling the selector 1053 and a signal for resetting the register 1052.

Figure 1C:
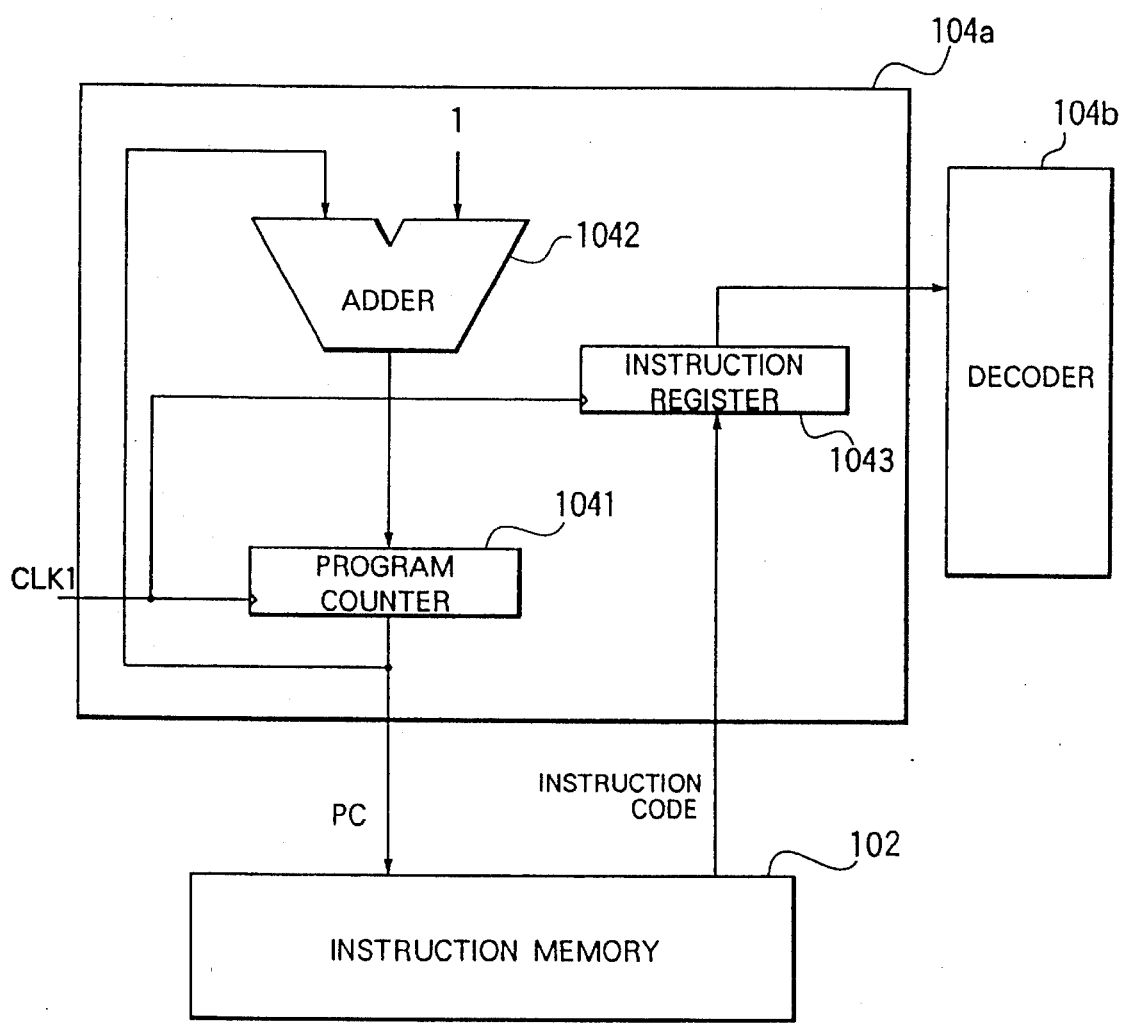

The sequencer 104a provided in the digital processor 101 is shown in a block diagram of FIG. 1C. The sequencer 104a includes as main components a program counter 1041, an adder 1042, and an instruction register 1043. With each cycle, the program counter 1041 is increased by 1 since the adder 1042 adds 1 to the current value. The sequencer 104a outputs the output PC of the program counter 1041 as an address of the instruction memory 102. The instruction code stored in the instruction memory 102 is read with PC as its address. Then, the instruction code is written in the instruction register 1043 from which the instruction code is supplied to the decoder 104b. Based on the foregoing control, the sequence 104a makes it possible to keep reading an instruction.

FIG. 2A is a chart of timing on which an instruction is executed for an external memory read cycle executed in the microprocessor 101.

In case the instruction read and executed by the sequencer 104a is an external memory reference instruction, the external memory reference control circuit 105 outputs an external address on a leading edge of the next CLK 2. The external memory 106 is designed to be referred to by the control circuit 105 within one cycle of the CLK 2. Hence, the data can be read in the chip on a leading edge of the next CLK 2.

The data-reading operation done in the memory reference control circuit 105 will be described with reference to FIGS. 1A and 1B. In the selector 105, normally, the holding signal is negated, and the operand of the external memory reference instruction is selected and output to the register 1052. If the external memory reference instruction signal is decoded, the external memory reference instruction signal is supplied and fetched in the register 1051 on CLK 1. At a time, the operand of the external memory reference instruction is fetched in the register 1052 on CLK 1.

Then, the synchronous control circuit 1055 supplies the holding signal on CLK 1 by using the external memory reference instruction signal fetched in the register 1051. Hence, the register 1052 is held until the holding signal is negated.

The cycle control circuit 1054 starts the memory cycle in synchronization with CLK 2 through the synchronous control circuit 1055. The synchronous control circuit 1055 outputs the RESET signal for resetting the register 1052 on the leading edge of the cycle of CLK 2 in which the memory cycle is terminated and on the leading edge of the next CLK 1. At that time, the holding signal is negated, and the operand of the resource reference instruction is fetched in the register 1052.

During the execution of the external memory reference instruction, the sequencer 104a serves continuously to read instructions from the instruction memory in such a manner that it executes the instructions for concurrently referring to the resources unoccupied by the external memory reference instruction being executed.

Figures 1, 2B:
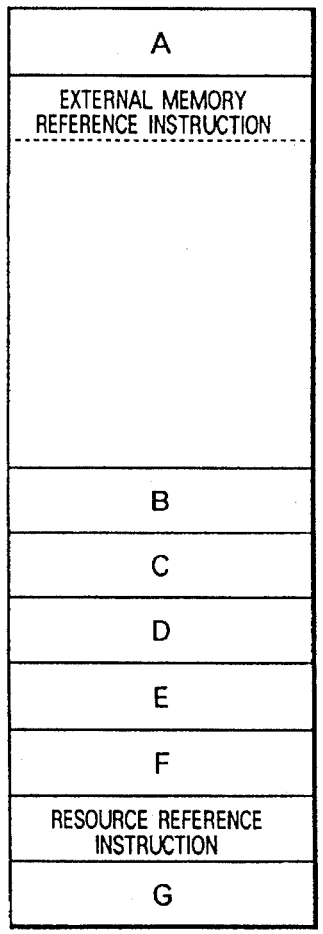
FIG. 2B-1 is a view showing a sequence in which instructions are executed in a conventional digital processor.
Figures 2, 2B:
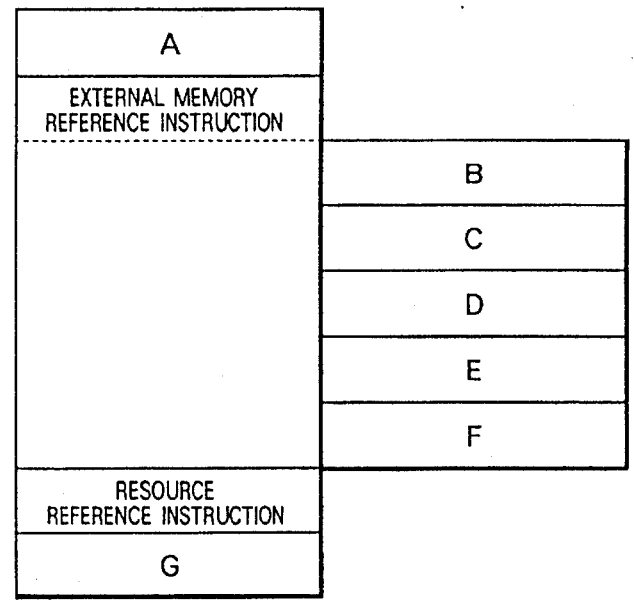

The executing sequence of the conventional digital processor is shown in FIG. 2B-1, and the executing sequence of the digital processor according to the first embodiment is shown in FIG. 2B-2. The instructions B, C, D, E, F refer to resources unoccupied by the external memory reference instruction. The conventional digital processor terminates the execution of the external memory reference instruction before the instruction B is executed. The digital processor designed according to the first embodiment is capable of executing the instructions B, C, D, E, and F concurrently with the external memory reference instruction.

Hence, as the cycle executed in the external memory 106 is slower than CLK 1, more instructions for referring to the resources unoccupied by the external memory reference instruction can be executed.

In this case, for using the data read on the external memory reference instruction, it is necessary to await passage of several cycles. The cycles to be awaited are defined on the basis of the frequencies of CLK 1 and CLK 2.

The arrangement of the digital processor designed according to the second embodiment is similar to that of the first embodiment shown in FIGS. 1A, 1B and 1C, except in the manner in which the digital processor of the second embodiment controls the external memory reference control circuit 105.

The digital processor according to the second embodiment is capable of executing the stream of data continuous transfer instruction for continuously transferring streams of data between the external memory and the digital processor in addition to the external memory reference instruction described with respect to the first embodiment. That is, the stream of data continuous transfer instruction has a function of pre-setting a format of a stream of data to be transferred (number of pieces of data or the like) and transferring the data between the digital processor and the external memory based on the continuous cycles.

FIG. 3 is a timing chart of a read cycle for the external memory provided on the stream of data continuous transfer instruction done in the digital processor 101 of the second embodiment.

Assuming that the stream of data continuous transfer instruction is read and executed by the program control unit 104, the external memory reference control circuit 105 serves to control the external memory reference cycle described with respect to the first embodiment until the transfer of the predetermined number of pieces of data is terminated. The control is done independently of the sequencer 104a. The external memory reference control circuit 105 also serves to supply the holding signal during a period from the first external memory reference cycle to the last external memory reference cycle. Even during the execution of the stream of data continuous transfer instruction, the sequencer 104a is capable of executing instructions for referring to resources unoccupied by the stream of data continuous transfer instructions concurrently with the stream of data continuous transfer instruction being executed.

Figure 4A:
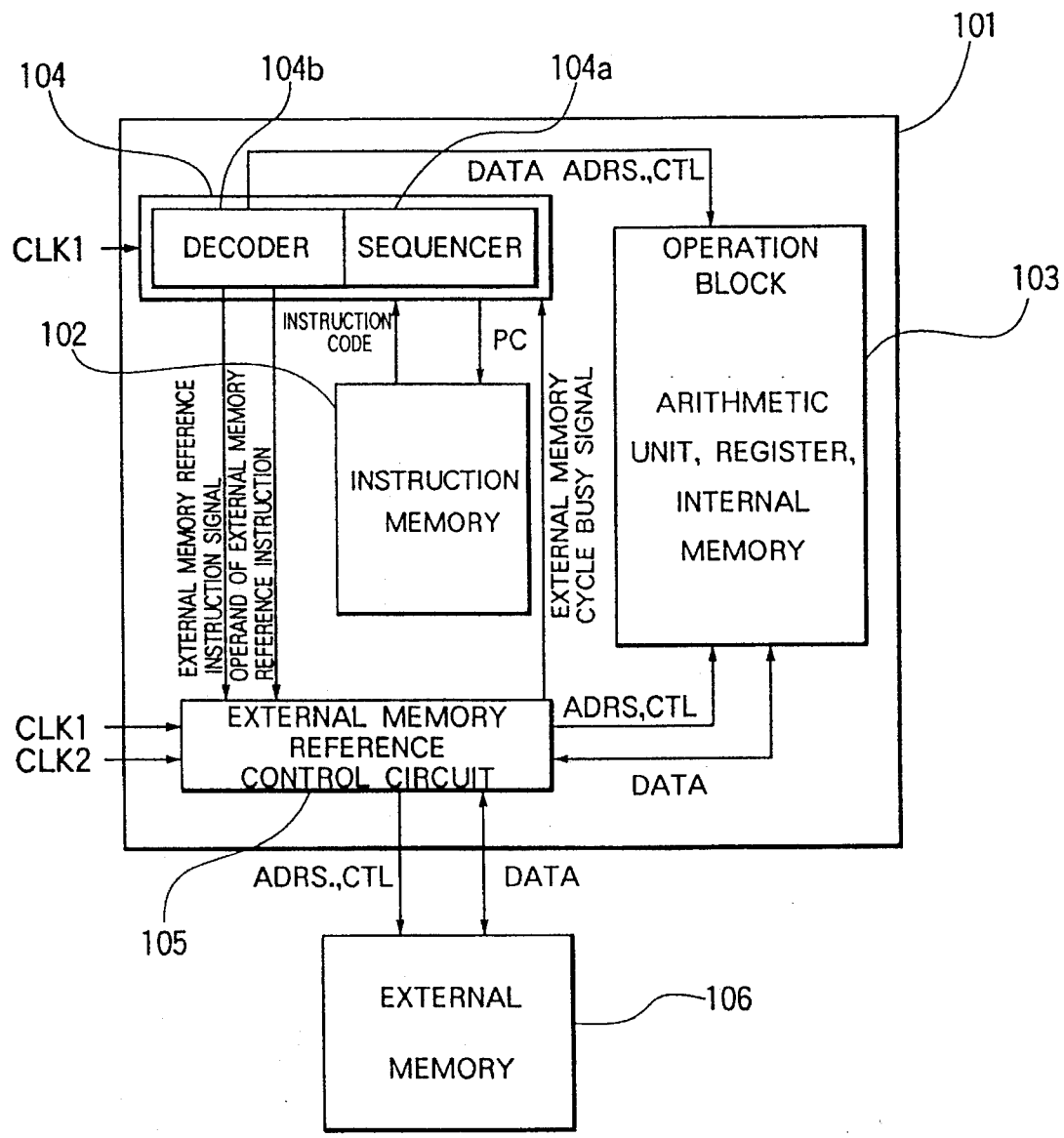
FIGS. 4A, 4B, and 4C are block diagrams showing a digital processor according to a third embodiment of the present invention.

The digital processor designated according to a third embodiment of the invention is shown in a block diagram of FIG. 4A. The digital processor 101 shown in FIG. 4A is implemented by the same components as those of the digital processor of the first embodiment, except that the sequencer 104a is controlled by the external memory reference control circuit 105. That is, the external memory reference control circuit 105 supplies a memory cycle busy signal to the sequencer 104a.

Figure 4B:
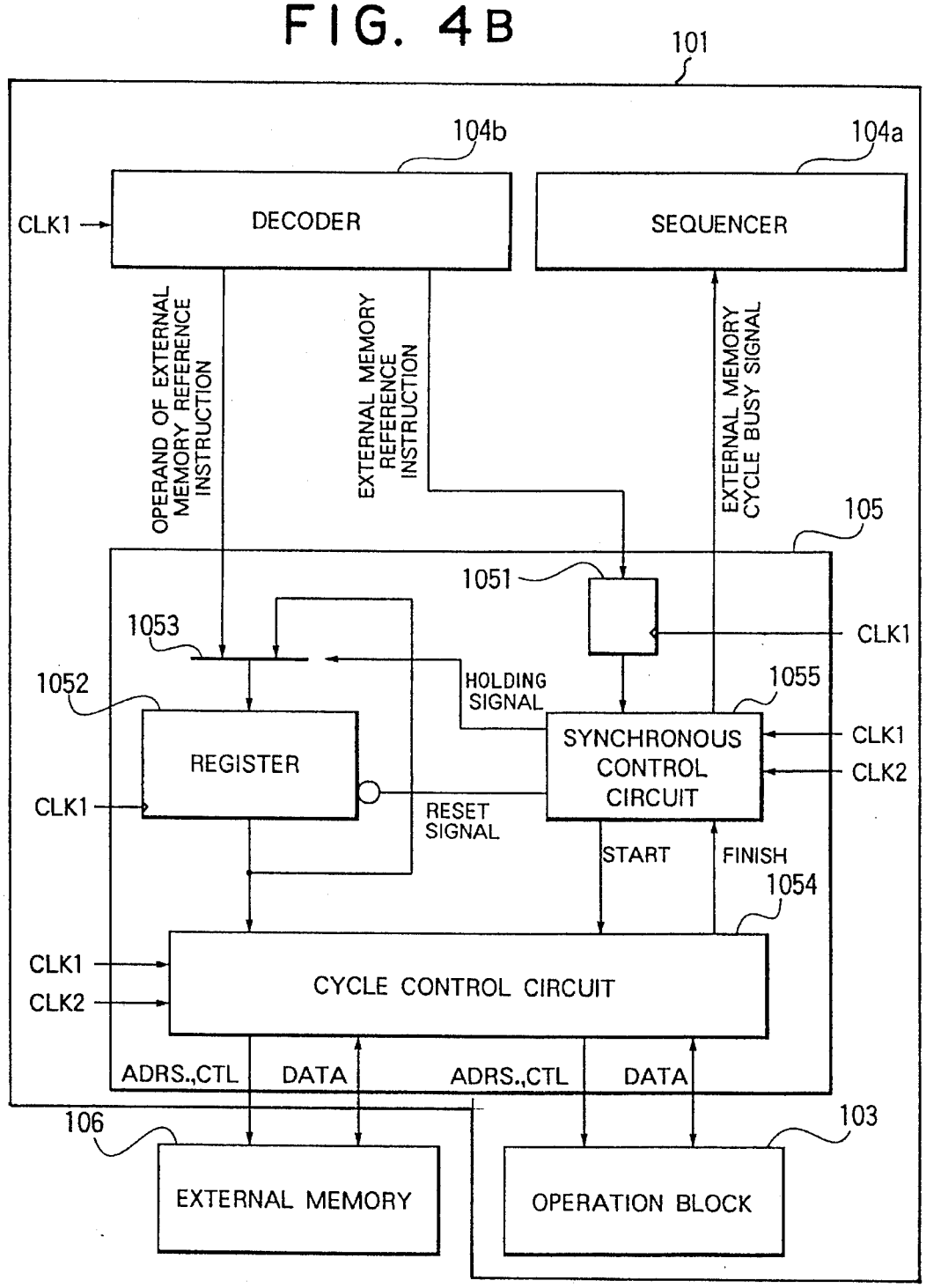
Figure 4C:
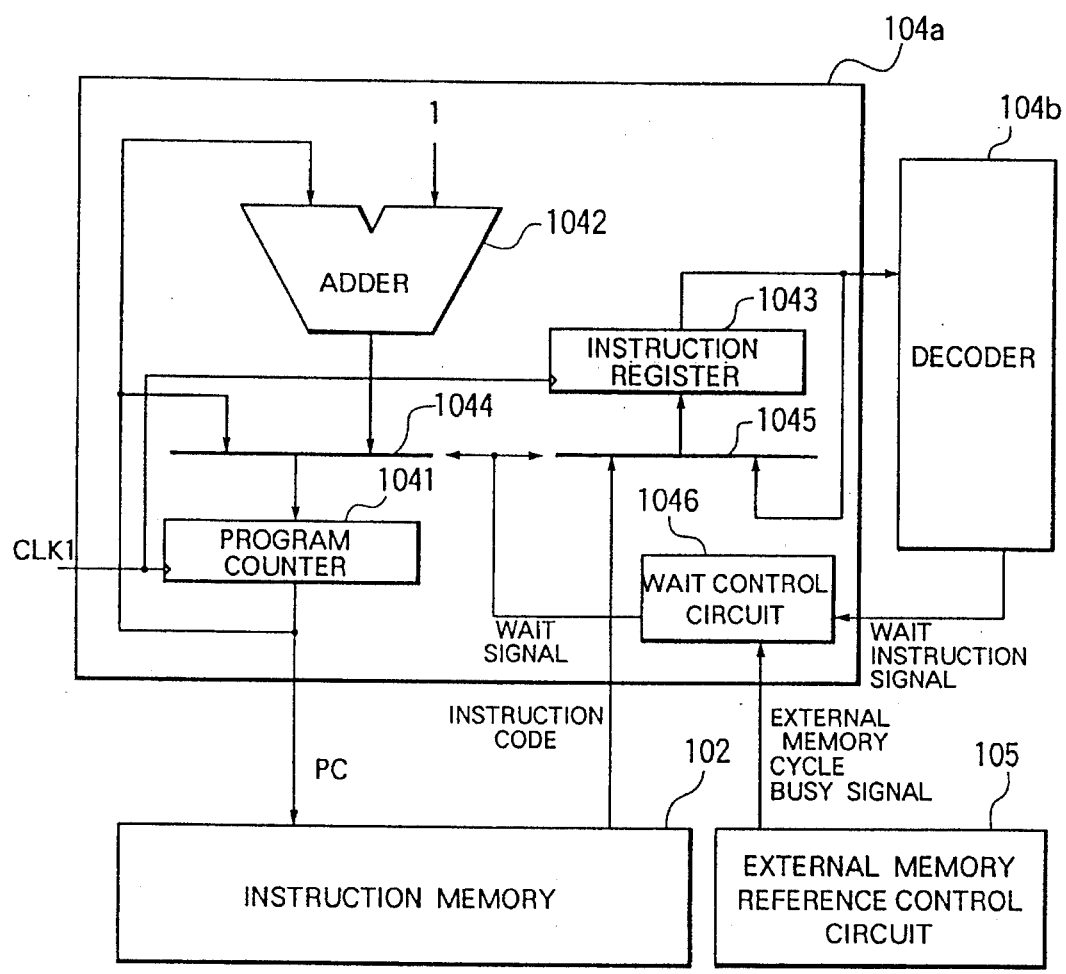

FIGS. 4B and 4C are block diagrams showing the external memory reference control circuit 105 and the sequencer 104a included in the digital processor of the present embodiment. The external memory reference control circuit 105 shown in FIG. 4B is implemented by the substantially same components as those of the external memory reference control circuit described with respect to the first embodiment. The external memory cycle busy signal functions as the holding signal used in the first embodiment. Hence, the busy signal is supplied during the execution of the external memory reference instruction.

The sequencer 104a shown in FIG. 4C includes as main components a program counter 1041, an adder 1042, an instruction register 1043, selectors 1044, 1045 for holding the sequence operation, and a WAIT control circuit 1046 for controlling the holding of the sequencer operation. That is, unlike the first embodiment, the sequencer 104a provides the selectors 1044, 1045 and the WAIT control circuit 1046 in addition to the main components of the first embodiment. In operation, in case the external memory cycle busy signal and the WAIT instruction signal output from the decoder 104b are both supplied, the WAIT control circuit 1046 serves to control the selectors 1044 and 1045 so that the program counter 1044 and the instruction register 1043 are held. The WAIT instruction signal is a signal produced by analyzing the WAIT instruction (to be described) and is supplied if the wait instruction is issued.

In the digital processor 101 capable of executing the instructions for referring to the resources unoccupied by the external memory reference instruction concurrently with the external memory reference instruction being executed, consider the case of execution of a resource reference instruction for referring to the resource by the external memory reference instruction being executed. In this case, it is checked whether or not the external memory cycle is busy, and, if it is busy, the sequencer is held so that the later instructions are not allowed to be executed. For this purpose, the wait instruction is stored in the instruction memory 102 one or more cycles before the resource reference instruction is executed.

Figure 5A:
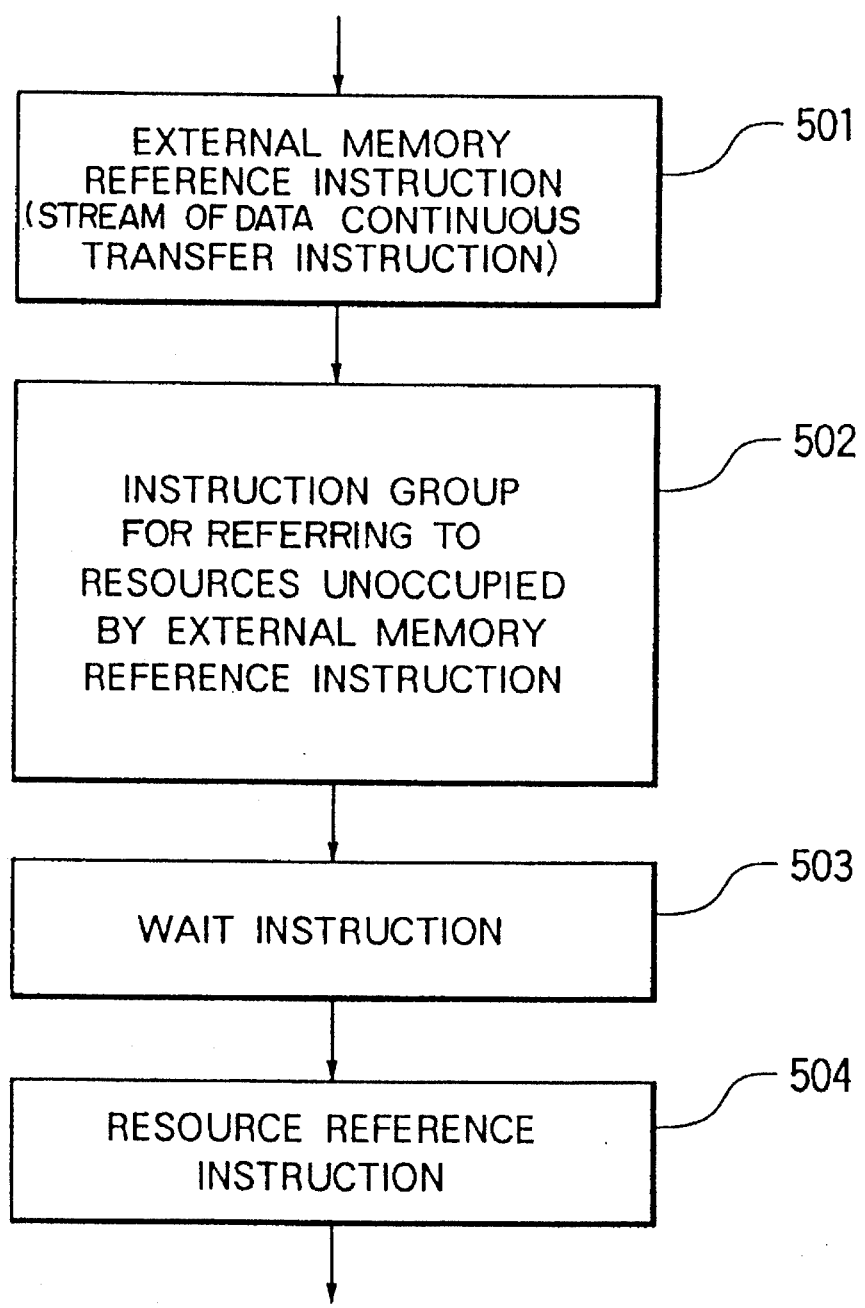
FIG. 5A is a flowchart showing the process involving a WAIT instruction.

The foregoing operation can be summarized as an algorithm shown in FIG. 5A. In the overall process, when the external memory reference instruction 501 is read, the instruction group 502 for referring to the resources unoccupied by the instruction 501 is placed immediately after the external memory reference instruction 501. That is, the processing sequence is such that the external memory reference instruction 501, the instruction group 502 for referring to the resources unoccupied by the instruction 501, the WAIT instruction 503, and the resource reference instruction 504 for referring to the resource occupied by the external memory reference instruction 501 are placed in that order.

FIG. 5B is a timing chart based on the process shown in FIG. 5A. The digital processor designed according to the present embodiment functions in a substantially similar manner to the digital processor designed according to the second embodiment, except that the WAIT instruction is used for controlling the sequencer. The timing chart shown in FIG. 5B indicates when the WAIT instruction is executed while the external memory reference instruction is being executed.

Figure 5C:
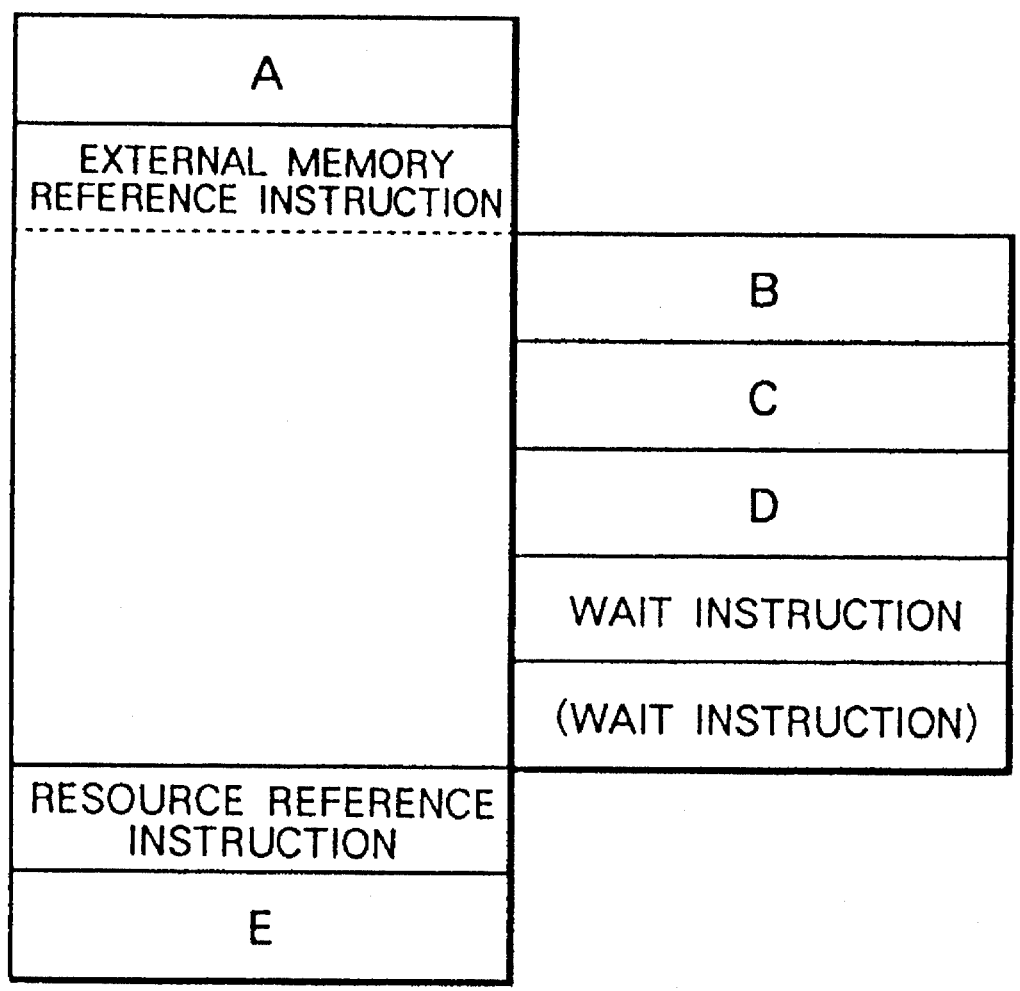
FIG. 5C is a view showing a sequence on which instructions are executed in the digital processor according to the third embodiment.
Figure 6:
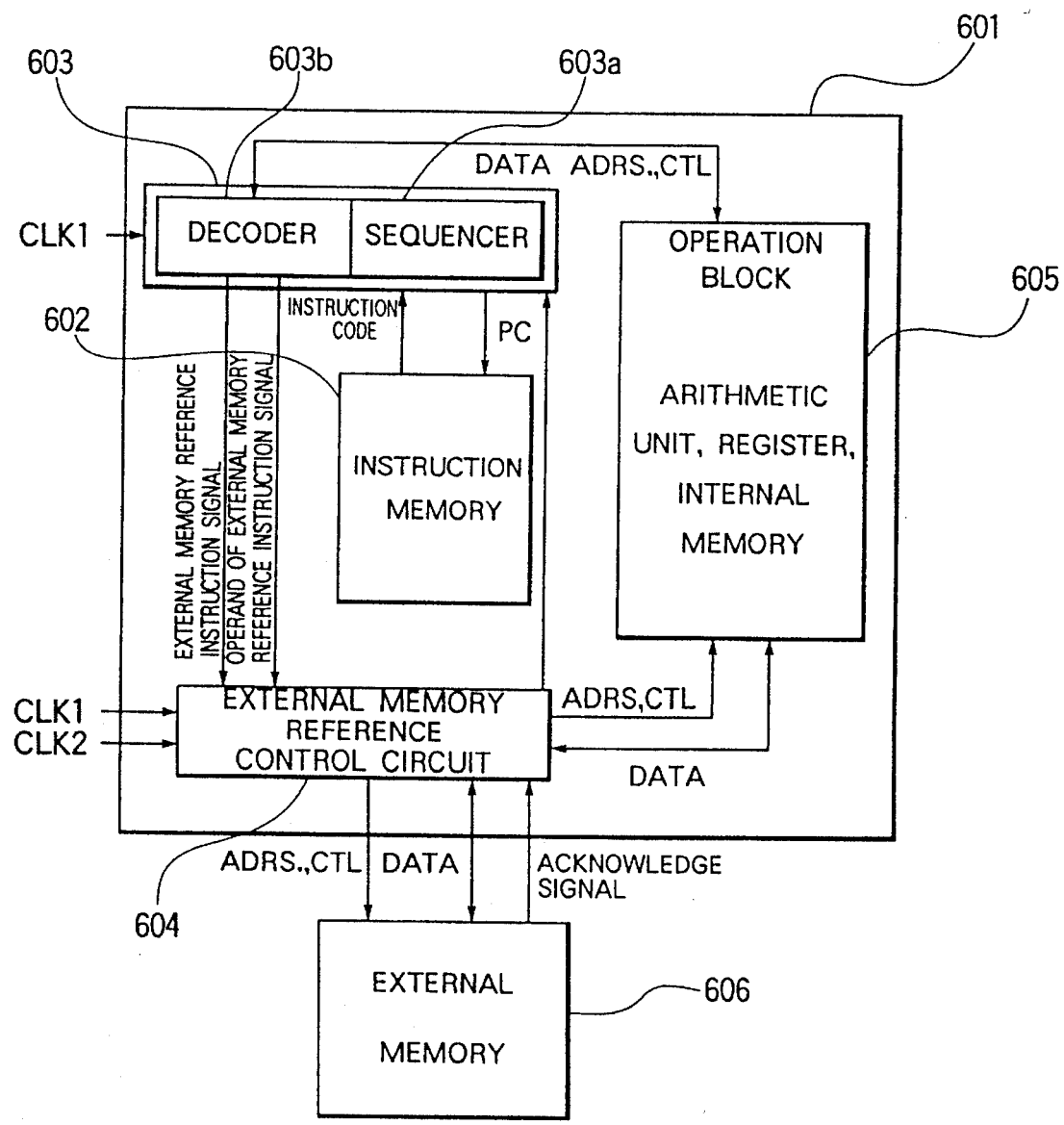
FIG. 6 is a block diagram showing a conventional digital processor.
Figure 7:
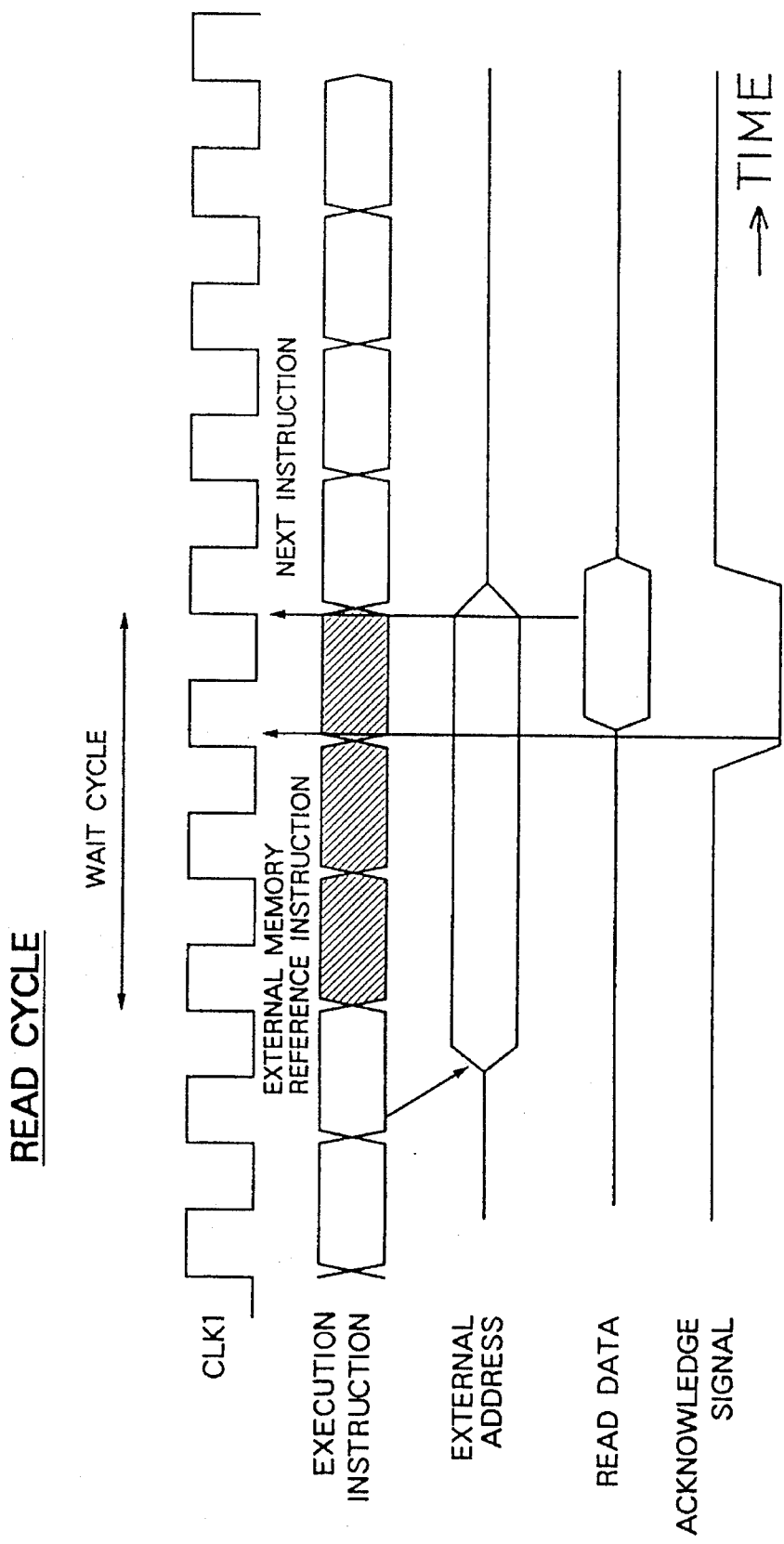
FIG. 7 is a timing chart of the conventional digital processor.

During the execution of the external memory reference instruction, the external memory cycle busy signal is supplied. Hence, to execute the WAIT instruction during the execution time, the wait control circuit 104b of the sequencer 104a shown in FIG. 4C serves to supply the WAIT signal and to switch the selectors 1044 and 1045 in a manner to allow the sequencer 104a to be held. The sequencer 104a therefore keeps the WAIT instruction being executed until the external memory cycle busy signal is negated, that is, the external memory reference instruction is terminated. When the external memory cycle busy signal is negated, the resource reference instruction is executed. FIG. 5C shows the executing sequence of the instructions used in this embodiment. FIG. 5D is a timing chart based on the third embodiment applied to the digital processor designed according to the second embodiment.

The foregoing description of the first to the third embodiments has been concerned with the read cycle. Those embodiments are capable of executing a similar control in the write cycle.

The digital processor of the first embodiment has a capability of concurrently executing instructions for referring to resources unoccupied by the external memory reference instruction being executed, thereby enhancing a throughput of the total processing.

The digital processor of the second embodiment has a capability of concurrently executing instructions for referring to resources unoccupied by the stream of data continuous transfer instruction for the external memory being executed, thereby enhancing a throughput of the total processing.

The digital processor of the third embodiment has a capability of properly referring to the same resource in synchronization if the instructions are started for referring to the resource being occupied by the external memory reference instruction, thereby improving a throughput of the total processing.

What is claimed is:

1. A digital processor comprising:

an instruction memory;

a sequencer for reading instructions from said instruction memory;

a decoder for analyzing said instructions, incorporated on a semiconductor chip; and an external memory reference control circuit comprising:
   a first storage means for fetching an external memory reference instruction signal being output from said decoder;
   a second storage means for fetching an operand of said external memory reference instruction;
   a selection means for holding said operand in said second storage means;
   a cycle control circuit for controlling an external memory associated with said digital processor and internal resources of said digital processor; and
   a synchronous control circuit for providing a start signal to said cycle control circuit and for providing a holding signal for controlling said selection means and a reset signal for resetting said second storage means when said synchronous control circuit senses termination of said external memory reference instruction by receiving a termination signal;

said sequencer serving to keep later instructions being read while said external memory reference instruction is being executed and to execute the later instructions concurrently with said external memory reference instruction if said later instructions are an instruction group for referring to resources unoccupied by said external memory reference instruction.

2. The digital processor as claimed in claim 1, wherein if a resource reference instruction is executed for referring to a resource occupied by said external memory reference instruction being executed, said external memory reference control circuit serves to send out an external memory cycle busy signal to said sequencer while said external memory reference instruction is being executed, and said sequencer serves to hold a current executing step of the resource reference instruction if a WAIT instruction for checking whether or not the external memory cycle is busy determines that said external memory cycle busy signal indicates a BUSY state during the execution of said external memory reference instruction, and to proceed to a subsequent step of the resource reference instruction if said WAIT instruction determines that said external memory cycle busy signal indicates a READY state.

3. A digital processor for implementing an instruction to transfer continuously a stream of data to an external memory, said digital processor comprising:

an instruction memory;

a sequencer for reading instructions from said instruction memory;

a decoder for analyzing said instructions, incorporated on a semiconductor chip and being capable of executing a stream of data continuous transfer instruction for an external memory; and an external memory reference control circuit comprising:
   a first storage means for fetching a stream of data continuous transfer signal being output from said decoder;
   a second storage means for fetching an operand of said stream of data continuous transfer instruction;
   a selection means for holding said operand in said second storage means;
   a cycle control circuit for controlling an external memory associated with said digital processor and internal resources of said digital processor; and
   a synchronous control circuit for providing a start signal to said cycle control circuit and for providing a holding signal for controlling said selection means and a reset signal for resetting said second storage means when said synchronous control circuit senses termination of said stream of data continuous transfer instruction by receiving a termination signal;

said sequencer serving to keep later instructions being read while said stream of data continuous transfer instruction is being executed and to execute the later instructions concurrently with said stream of data continuous transfer instruction if said later instructions are an instruction group for referring to resources unoccupied by said stream of data continuous transfer instruction.

4. The digital processor as claimed in claim 3, wherein if a resource reference instruction is executed for referring to a resource occupied by said stream of data continuous transfer instruction for the external memory being executed, said external memory reference control circuit serves to send out an external memory cycle busy signal to said sequencer while said stream of data continuous transfer instruction is being executed, and said sequencer serves to hold a current executing step of the resource reference instruction if a WAIT instruction for checking whether or not the external memory cycle is busy determines that said external memory cycle busy signal indicates a BUSY state during the execution of said stream of data continuous transfer instruction, and to proceed to a subsequent step of the resource reference instruction if said WAIT instruction determines that said external memory cycle busy signal indicates a READY state.

5. A digital processor, comprising:

(a) an instruction memory for storing instructions including an external memory reference instruction and other instructions;

(b) a sequencer for receiving a first clock signal and reading said instructions from said instruction memory in response to said first clock signal;

(c) a decoder for analyzing said instructions to output instruction signals including an external memory reference instruction signal representing said external memory reference instruction and other instruction signals representing said other instructions;

(d) an operation block comprising executing means for executing at least some of said external memory reference instruction and said other instructions in response to the first clock signal; and (e) an external memory reference control circuit for receiving a second clock signal and controlling reference to an external memory in response to said second clock signal and said external memory reference instruction signal;

said external memory reference control circuit including:

(i) a first storage means responsive to the first clock signal for fetching and storing said external memory reference instruction signal output from said decoder;

(ii) a second storage means responsive to the first clock signal for fetching and storing an operand of said external memory reference instruction;

(iii) a selection means for holding said operand in said second storage means;

(iv) a cycle control circuit for controlling said external memory and said operation block; and (v) a synchronous control circuit, synchronized with the first clock signal and the second clock signal, for providing a start signal to said cycle control circuit, and for providing a holding signal for controlling said selection means and a reset signal for resetting said second storage means when said synchronous control circuit senses a termination of execution of said external memory reference instruction upon receipt of a termination signal from said cycle control circuit, wherein:

when said external memory reference instruction is read out from said instruction memory by said sequencer, the external memory reference instruction signal and said operand are fetched and stored by said first and second storage means respectively, said sequencer continues to read out said other instructions from said instruction memory even while said external memory reference instruction is being executed, and said selection means controls said second storage means to hold said operand until a termination of an external memory cycle executed by said external memory reference instruction and to release said operand upon termination of the external memory cycle, and when said other instructions are instructions which use resources unoccupied by said external memory reference instruction, said other instructions are executed in parallel with said external memory reference instruction.

6. The digital processor as claimed in claim 5, wherein:

said sequencer comprises an instruction register for holding said external memory reference instruction and said other instructions, a selector for holding the instruction register and a wait control circuit for controlling an operation of said selector, and while said external memory reference instruction is being executed, when execution of a resource reference instruction for making reference to a resource occupied by said external memory reference instruction is required, said external memory reference control circuit sends out an external memory cycle busy signal to said wait control circuit while said external memory reference instruction is being executed, and said wait control circuit controls said selector in said sequencer to hold said instruction register if said external memory cycle busy signal sent from said external memory reference control circuit indicates a busy state, and to make said sequencer proceed to a next step if said external memory cycle busy signal indicates a ready state.

7. The digital processor as claimed in claim 5, further comprising a semiconductor chip having said elements (a)–(e) incorporated therein.

8. A digital processor for executing an instruction for continuously transferring a stream of data between said digital processor and an external memory, said digital processor comprising:

(a) an instruction memory for storing instructions including said instruction for continuously transferring said stream of data between said digital processor and said external memory and other instructions;

(b) a sequencer for receiving a first clock signal and reading said instruction for continuously transferring said stream of data and said other instructions from said instruction memory in response to the first clock signal;

(c) a decoder for analyzing said instruction for continuously transferring said stream of data and said other instructions to output instruction signals including a signal indicating said instruction for continuously transferring said stream of data and other instruction signals representing said other instructions;

(d) an operation block comprising executing means for executing at least some of said instruction for continuously transferring said stream of data and said other instructions in response to the first clock signal; and (e) an external memory reference control circuit for receiving a second clock signal and controlling reference to the external memory in response to the second clock signal and said signal indicating said instruction for continuously transferring said stream of data;

said external memory reference control circuit including:

(i) a first storage means responsive to the first clock signal for fetching and storing said signal indicating said instruction for continuously transferring the stream of data outputted from said decoder;

(ii) a second storage means responsive to the first clock signal for fetching and storing an operand of said instruction for continuously transferring the stream of data;

(iii) a selection means for holding said operand in said second storage means;

(iv) a cycle control circuit for controlling said external memory and the operation block; and (v) a synchronous control circuit, synchronized with the first clock signal and the second clock signal, for providing a start signal to said cycle control circuit, and for providing a holding signal for controlling said selection means and a reset signal for resetting said second storage means when said synchronous control circuit senses a termination of execution of said instruction for continuously transferring the stream of data upon receipt of a termination signal from said cycle control circuit, wherein:

when said instruction for continuously transferring the stream of data is read out from said instruction memory by said sequencer, the signal indicating said instruction for continuously transferring the stream of data and said operand are fetched and stored by said first and second storage means respectively, said sequencer continues to read out said other instructions from said instruction memory even while said instruction for continuously transferring the stream of data is executed, and said selection means controls said second storage means to hold said operand until termination of an external memory cycle executed by said instruction for continuously transferring the stream of data and to release said operand upon termination of the external memory cycle, and when said other instructions are instructions which use resources unoccupied by said instruction for continuously transferring the stream of data, said other instructions are executed in parallel with said instruction for continuously transferring the stream of data.

9. The digital processor as claimed in claim 8, wherein:

said sequencer comprises an instruction register for holding said instruction for continuously transferring a stream of data and said other instructions, a selector for holding the instruction register and a wait control circuit for controlling an operation of said selector, and while said instruction for continuously transferring the stream of data is being executed, when execution of a resource reference instruction for making reference to a resource occupied by said instruction for continuously transferring the stream of data is required, said external memory reference control circuit sends out an external memory cycle busy signal to said wait control circuit while said instruction for continuously transferring the stream of data is being executed, and said wait control circuit in said sequencer controls said selector in said sequencer to hold said instruction register if said external memory cycle busy signal sent from said external memory reference control circuit indicates a busy state, and to make said sequencer proceed to a next step if said external memory cycle busy signal indicates a ready state.

10. The digital processor as claimed in claim 8, further comprising a semiconductor chip having said elements (a)–(e) incorporated therein.

* * * * *